Oct. 31, 1961
P. E. YOST
3,006,584
BALLOON LOAD LOWERING MECHANISM
Filed Jan. 28, 1957
2 Sheets-Sheet 1
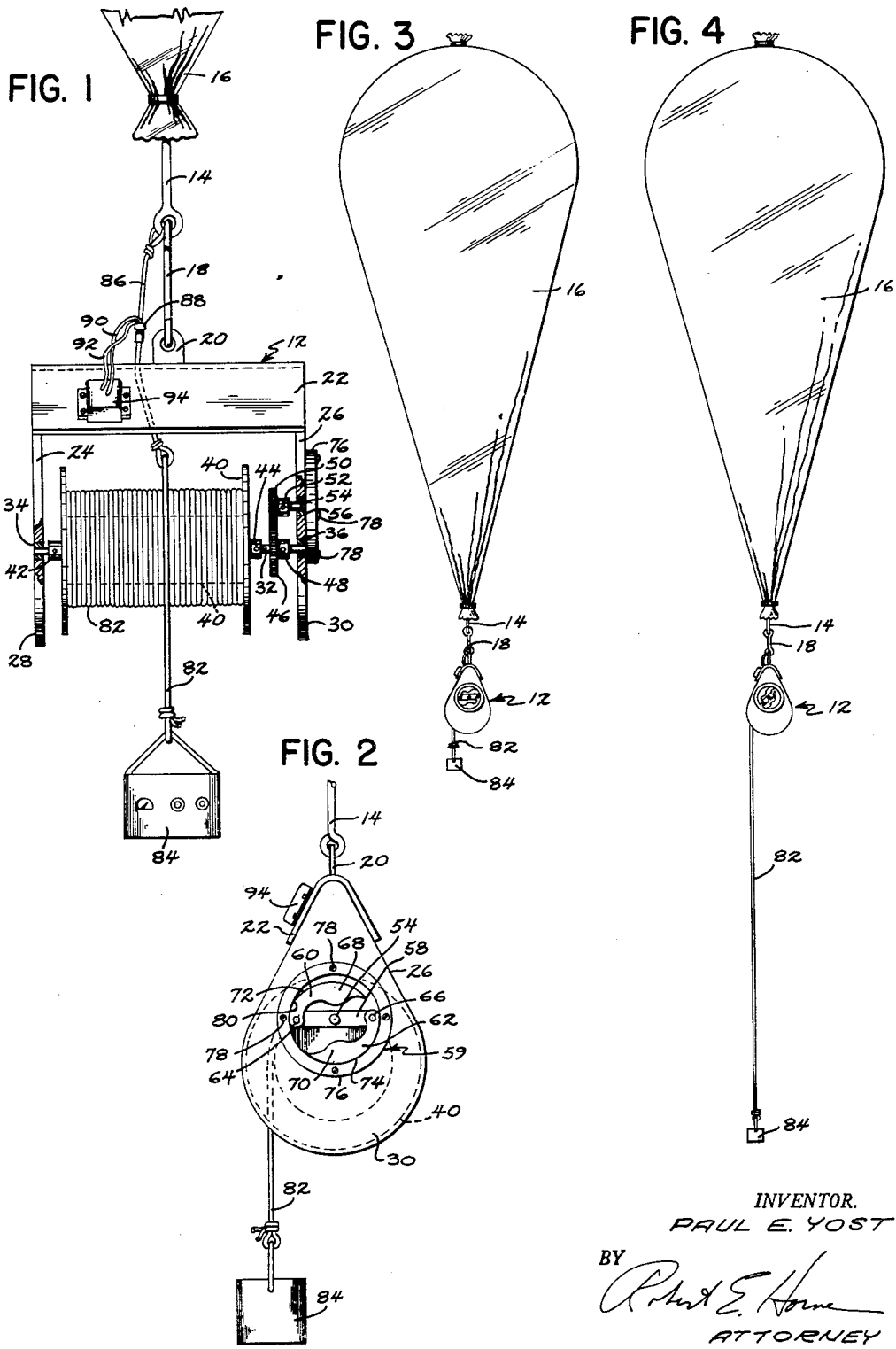
INVENTOR.
PAUL E. YOST
BY
Robert E. Horne
ATTORNEY Oct. 31, 1961 P. E. YOST 3,006,584
BALLOON LOAD LOWERING MECHANISM
Filed Jan. 28, 1957 2 Sheets-Sheet 2
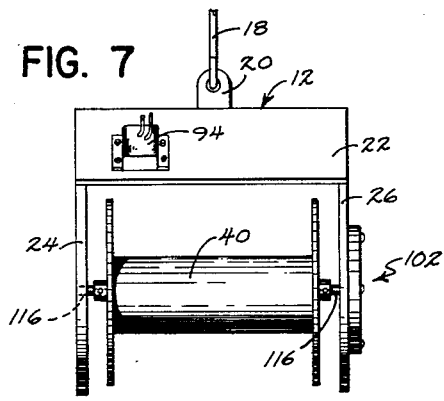
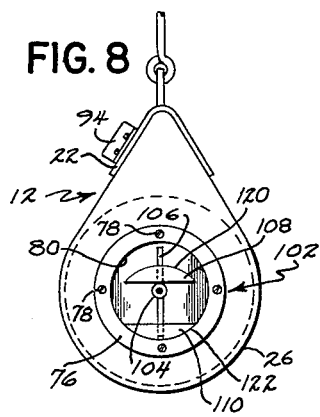
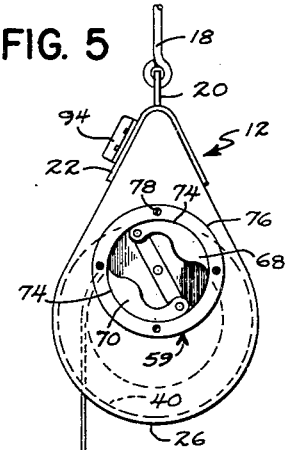
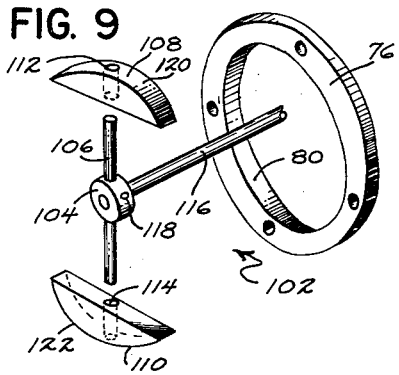
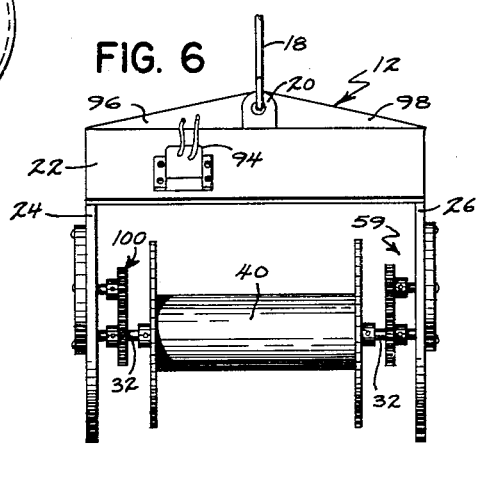
INVENTOR.
PAUL E. YOST
BY
Robert S. Howe
ATTORNEY

United States Patent Office 3,006,584
Patented Oct. 31, 1961

3,006,584
BALLOON LOAD LOWERING MECHANISM
Paul E. Yost, Sioux Falls, S. Dak., assignor to General Mills, Inc., a corporation of Delaware
Filed Jan. 28, 1957, Ser. No. 636,558
5 Claims. (Cl. 244—127)

The present invention relates to a balloon load lowering mechanism and more specifically to a balloon load lowering mechanism designed to safely lower a balloon load to an extended position beneath a balloon.

In balloon flights the load carried aloft is ordinarily attached directly to a load ring or lower end fitting of the balloon. However, when equipment such as radio transmitters are sent aloft the radio transmission, for example, may be adversely affected due to the immediate presence of the balloon and its auxiliary equipment. The transmitters, it has been determined, function more effectively when suspended at length beneath the balloon. It has also been observed that other equipment such as photographic recording instruments cannot produce decisive results when secured directly beneath the balloon since it is often required that the balloon be included as a part of the photographic records obtained by its photographic equipment.

A solution to the problem is to attach the equipment to a length of line of sufficient length to suspend it some distance below the balloon. However, in balloon launching operations wind conditions are often variable and that equipment attached on a length of line makes it difficult to launch the balloon and often the equipment is damaged during launching.

It is therefore an object of this invention to provide a balloon load lowering mechanism which will retain the balloon load relatively near the lower end of the balloon during the launching operations and which will permit the load to move to an extended position when the balloon reaches a prescribed altitude.

A further object of the invention is to provide a balloon load lowering mechanism which will lower the balloon load to a desired position without damage to the equipment forming the balloon load.

Another object of the invention is to provide a versatile, inexpensive balloon load lowering mechanism which can be utilized to handle various load weights and sizes.

These and other objects will become more fully apparent in the following specification and illustrated in the enclosed drawings in which:

FIGURE 1 is an enlarged view of the lower end of a balloon with one embodiment of the lowering mechanism attached thereto;

FIG. 2 is an enlarged end view of FIG. 1;

FIG. 3 is an elevational view of a balloon with the lowering mechanism and its load supported relatively near the lower end of the balloon;

FIG. 4 is an elevational view like FIG. 3 but with the load moved to an extended position;

FIG. 5 is an enlarged end view similar to FIG. 2;

FIG. 6 is a front elevational view of another preferred embodiment of the load lowering mechanism;

FIG. 7 is a front elevational view of a simplified embodiment of the load lowering mechanism;

FIG. 8 is an end view of FIG. 7; and

FIG. 9 is an isometric view of the braking assembly of FIG. 8.

As shown in FIG. 1, the balloon load lowering mechanism shown generally by the numeral 12 is attached to the lower end fitting 14 of a balloon 16 by a suspension rod 18. The lowering mechanism 12 is supported on the suspension rod 18 by a bracket 20 which is affixed to a top plate 22.

Connected to top plate 22 and suspended downward therefrom are vertical support plates 24 and 26. The support plates 24 and 26 are formed of relatively light weight material such as aluminum and have broad flat surfaces 28 and 30 extending normal to the top plate 22.

A horizontal shaft 32 is located near the lower portion of the support plates 24 and 26 and positioned parallel to the top plate 22. The shaft 32 is journaled in bearings 34 and 36 which are mounted in the support plates 24 and 26. A reel 40 is secured to shaft 32 by set screws 42 and 44. Also secured to shaft 32 is a driving gear 46 positioned on the shaft 32 by a set screw 48.

Meshing with driving gear 46 is a driven gear 50 secured by a set screw 52 to a horizontal shaft 54. The shaft 54 is journaled in a bearing 56 in support plate 26 and extends outwardly beyond the surface 30 of the support plate 26. A cross member 58 is fixedly mounted on shaft 54. As seen in FIG. 2, the cross member 58 is a part of the braking assembly 59 and is provided with a pair of counterweights 60 and 62 identical in construction and pivotally mounted to the opposing ends of the cross member 58 by pins 64 and 66. As will be noted in FIG. 2 the counterweights 60 and 62 are provided on their ends opposite the pins 64 and 66 with enlarged end portions 68 and 70. The counterweights 60 and 62 are made of brass or other metals which are conductive to heat. The counterweights are also provided with generally radial surfaces 72 and 74.

A brake drum 76 is secured by screws 78 to the support plate 26 and provides a circular braking surface 80. It is against the braking surface 80 that the counterweights 60 and 62 are thrown by the rotation of the shaft 54 which acts to retard the rotation of shaft 54 and consequently reel 40 through shaft 32 and gears 46 and 50.

An instrument to be carried aloft by the balloon is that of a radio transmitter. The weight of the transmitter is, for example, 55 lbs., and the transmitter is to be lowered a distance of 80 feet beneath the balloon in order to prevent interference from the balloon mass during transmitting periods.

A nylon support cable 82 of the required length and strength is secured at one end to the reel 40 and is wound around the reel and secured at its other end to the transmitter 84. If the braking mechanism 12 is suspended from the balloon 16, the weight of the transmitter 84 is sufficient to cause the nylon cable 82 to unwind from the reel 40.

To prevent lowering of the transmitter 84 and to support it until a prescribed time of release, a tie-off cable 86 is provided. The tie-off cable 86 is secured at one end to the support cable 82 generally near the load 84, and the other end is secured to the end fitting 14 on the balloon 16.

With the tie-off cable 86 in position the weight of the transmitter 84 is no longer borne by the reel 40 but rather is supported by the tie-off cable 86.

Attached to the tie-off cable 86 is a dynamite squib 88. The dynamite squib 88 is of the type well known in the art and may be activated by an electric current from a battery source to sever the tie-off cable 86.

The squib 88 is connected by lead wires 90 and 92 to an altitude control switch 94. The altitude control switch 94 is not herein shown and described in detail but is a pressure sensitive device such as a "barometric switch." When the balloon reaches a predetermined altitude a circuit is completed through a battery (not shown) to the lead wires 90 and 92 to activate the squib 88 and sever the tie-off cable 86.

When the tie-off cable 86 is severed the transmitter 84 is free to move downwardly. In so doing, the support cable 82 which is secured to the transmitter 84 causes the reel 40 and shaft 32 to rotate. As the shaft 32 turns, the driving gear 46 in mesh with the driven gear 50 rotates the shaft 54. As the shaft 54 rotates, the cross member 58 is also rotated carrying therewith the counterweights 60 and 62. The counterweights 60 and 62 being pivotally mounted to the cross member 58 are thrown outwardly by centrifugal force to engage the braking surface 80 of the brake drum 72.

As the transmitter 84 drops downwardly the rotation of the shaft 32 increases to drive the gears 46 and 50 at a faster rate. (It is to be pointed out that the gear reduction between the driving and driven gears may be modified for any amount of weight to be lowered. However, it has been found that a 2:1 ratio is adequate in most cases.) As the transmitter 84 falls the counterweights 60 and 62 are thrown outward by centrifugal force sufficient to create friction between the radial surfaces 72 and 74 and the braking surface 80 to provide a retarding movement which is transmitted through shafts 32 and 54 to the reel 40 through the cable 82 and downwardly to the transmitter 84.

The preferred embodiment of my invention can be constructed to accommodate various sizes and types of load weights. When large loads are to be lowered the braking mechanism 12 can be modified as shown in FIG. 6. The braking mechanism 12 in its modified form includes additional supporting brackets 96 and 98 to accommodate an increased load and is also provided with an additional counterweight and gear assembly 100. It is also possible to increase the size of the braking mechanism 12 should the size of the load require it.

Another embodiment of the invention is shown in FIGS. 7, 8 and 9 wherein the braking mechanism 12 is provided with a simplified counterweight assembly 102. The counterweight assembly 102 consists of a hub 104 which is provided with a crosspin 106.

The crosspin 106 is provided with a pair of counterweights 108 and 110 which are slidably mounted on the crosspin in openings 112 and 114. The counterweights 108 and 110 are positioned on opposing sides of the hub 104 and are surrounded by the brake drum 76 and its braking surface 80. The hub 104 is secured to the end of shaft 116 by set screw 118 and is rotatable therewith. The reel 40 is mounted on shaft 116 and rotates therewith. It will be noted that gears 46 and 50 have been eliminated from this type of unit. It was found that a direct rotation of the shaft 116 is sufficient to lower small loads such as cameras, etc., beneath the balloon 16, thus decreasing the cost of manufacturing the unit. However, it is to be pointed out that the hub and counterweight assembly 102 work equally well when used in combination with gears 46 and 50 in assembly 59 of FIGS. 2 and 5.

The counterweights 108 and 110 are moved outwardly by centrifugal force when the load is released. Likewise the counterweights 108 and 110 are provided with radial surfaces 120 and 122 which create a frictional force against the braking surface 80 to provide a retarding movement to the load in its downward descent. When the load has reached its lowermost position it is supported by the support cable 82 during the flight of the balloon.

I have in the foregoing drawings and description presented a detailed disclosure of the preferred embodiments of my invention. Many variations as to construction details herein shown and described will possibly occur to persons skilled in the art. Therefore it is not intended to limit the scope of the invention to the particular form disclosed but to cover all modifications and changes falling within the scope of the principles taught by my invention.

What is claimed:

1. A balloon load lowering mechanism for a balloon including in combination, a balloon, a supporting frame adapted to be attached to said balloon, a shaft and reel rotatably mounted in said frame, cable means secured at one end to said reel and wound therearound, said cable means having its other end adapted to be secured to a load, a retainer means fastened between said balloon and said cable means, means located on said supporting frame for severing said retainer means when said balloon reaches a prescribed altitude, braking means located on said supporting frame actuated by rotation of said shaft, said shaft rotatable as the load drops downwardly upon severance of said retainer means, whereby retardation of the movement of said load is caused by the action of said braking means actuated by rotation of said shaft, as said load moves to an extended position below the balloon.

2. The balloon load lowering mechanism of claim 1 wherein the braking means comprises, a brake drum attached to said frame provided with a circular braking surface, a driven shaft on said frame positioned normal to said braking surface and concentric therewith, a cross member affixed at its midpoints to said shaft, said cross member being in alignment with said braking surface, a pair of counterweights pivotally mounted at each of the ends of said cross member, said counterweights provided with a drum engaging surface, said driven shaft provided movement by the release of said load whereby said counterweights are urged outward against said braking surface to retard the downward movement of said load.

3. The balloon load lowering mechanism of claim 1 wherein said retainer means comprises a tie-off cable adapted to be secured at one end to an end fitting of the balloon and at the other end to said support cable relatively near said load, said severing means including a dynamite squib on said tie-off cable, and pressure sensitive actuating means associated with said squib and on said supporting frame, said actuating means actuating said squib upon the balloon reaching a prescribed altitude, said squib when actuated severing said tie-off cable to release said load, whereby said load provides movement to said shaft as said reel pays out said supporting cable until said load reaches said extended position.

4. The balloon load lowering mechanism of claim 1 wherein said braking means comprises, a brake drum mounted on said frame and provided with a circular braking surface, a driven shaft mounted on said frame normal to said braking surface and concentric therewith, a hub on said shaft, a crosspin centrally located on said hub, said crosspin being normal to said shaft and in alignment with said braking surface, a pair of counterweights slideably mounted on said crosspin, one on each of the opposing sides of said hub, said counterweights provided with drum engaging surfaces, whereby the downward movement of said load rotates said shaft to thereby urge said drum engaging surfaces against said braking surface to retard the downward movement of said load during its descent to said extended position.

5. A balloon load lowering mechanism for a balloon including in combination, a balloon member, a supporting frame member adapted to be attached to said balloon, a reel rotatably mounted on said frame member, cable means secured at one end to said reel and wound therearound, said cable means having its other end adapted to be secured to a load, a retainer member fastened between one of said balloon and frame members and said cable means, means located on one of said members for severing said retainer member when said balloon reaches a prescribed altitude, braking means located on said supporting frame member actuated by rotation of said reel, said reel being rotatable as the load drops downwardly upon severance of said retainer member, whereby retardation of the movement of said load is caused by the action of said braking means actuated by rotation of said reel as said load moves to an extended position below the balloon.

References Cited in the file of this patent

UNITED STATES PATENTS

| | | | |
|---|---|---|---|
| 357,239 | Smalley | Feb. 8, | 1887 |
| 462,228 | Amet | Nov. 3, | 1891 |
| 1,074,830 | Blochmann | Oct. 7, | 1913 |
| 1,308,155 | Adams | July 1, | 1919 |
| 1,358,325 | Osze | Nov. 9, | 1920 |
| 1,500,943 | Jolkovski | July 8, | 1924 |
| 2,680,577 | Frieder et al. | June 8, | 1954 |
| 2,721,712 | Frieder et al. | Oct. 25, | 1955 |
| 2,728,540 | Ebneter | Dec. 27, | 1955 |
| 2,756,948 | Winzen et al. | July 31, | 1956 |
| 2,757,882 | Maitland | Aug. 7, | 1956 |
| 2,759,692 | Bohl et al. | Aug. 21, | 1956 |

FOREIGN PATENTS

| | | |
|---|---|---|
| 1,053,454 | France | Sept. 30, 1953 |